(12) United States Patent
Zhang et al.

(10) Patent No.: US 9,491,487 B2
(45) Date of Patent: Nov. 8, 2016

(54) ERROR RESILIENT MANAGEMENT OF PICTURE ORDER COUNT IN PREDICTIVE CODING SYSTEMS

(71) Applicant: Apple Inc., Cupertino, CA (US)

(72) Inventors: Dazhong Zhang, Milpitas, CA (US); Xiaosong Zhou, Campbell, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 831 days.

(21) Appl. No.: 13/626,730

(22) Filed: Sep. 25, 2012

(65) Prior Publication Data

US 2014/0086315 A1 Mar. 27, 2014

(51) Int. Cl.
| | |
|---|---|
| *H04N 19/68* | (2014.01) |
| *H04N 19/91* | (2014.01) |
| *H04N 19/172* | (2014.01) |
| *H04N 19/65* | (2014.01) |
| *H04N 19/103* | (2014.01) |
| *H04N 19/57* | (2014.01) |
| *H04N 19/109* | (2014.01) |
| *H04N 19/166* | (2014.01) |
| H04N 19/13 | (2014.01) |
| H04N 19/174 | (2014.01) |
| H04N 19/573 | (2014.01) |
| H04N 19/58 | (2014.01) |

(52) U.S. Cl.
CPC ............ *H04N 19/68* (2014.11); *H04N 19/103* (2014.11); *H04N 19/109* (2014.11); *H04N 19/166* (2014.11); *H04N 19/172* (2014.11); *H04N 19/57* (2014.11); *H04N 19/65* (2014.11); *H04N 19/91* (2014.11); *H04N 19/13* (2014.11); *H04N 19/174* (2014.11); *H04N 19/573* (2014.11); *H04N 19/58* (2014.11)

(58) Field of Classification Search
CPC .. H04N 19/105; H04N 19/423; H04N 19/65; H04N 19/172; H04N 19/91; H04N 19/70; H04N 21/8547; H04N 21/242; H04N 19/68
See application file for complete search history.

(56) References Cited

U.S. PATENT DOCUMENTS

| | | | | |
|---|---|---|---|---|
| 3,971,888 A | * | 7/1976 | Ching | H04N 19/68 375/240.08 |
| 4,827,339 A | * | 5/1989 | Wada | H04N 7/148 348/390.1 |

(Continued)

FOREIGN PATENT DOCUMENTS

WO 99/56472 A1 11/1999

OTHER PUBLICATIONS

International Search Report, dated Oct. 7, 2013, from corresponding International Application No. PCT/US2013/054152.

(Continued)

*Primary Examiner* — David N Werner
(74) *Attorney, Agent, or Firm* — Baker & Hostetler, LLP

(57) ABSTRACT

Coding techniques for input video may include assigning picture identifiers to input frames in either long-form or short-form formats. If a network error has occurred that results in loss of previously-coded video data, a new input frame may be assigned a picture identifier that is coded in a long-form coding format. If no network error has occurred, the input frame may be assigned a picture identifier that is coded in a short-form coding format. Long-form coding may mitigate against loss of synchronization between an encoder and a decoder by picture identifiers.

32 Claims, 4 Drawing Sheets

(56) References Cited

U.S. PATENT DOCUMENTS

| | | | | |
|---|---|---|---|---|
| 5,703,889 | A * | 12/1997 | Shimoda | H04N 19/89 375/E7.088 |
| 5,739,860 | A * | 4/1998 | Hoshino | H04N 9/8042 348/384.1 |
| 6,049,570 | A | 4/2000 | Fukunaga et al. | |
| 6,357,028 | B1 | 3/2002 | Zhu | |
| 6,836,514 | B2 * | 12/2004 | Gandhi | H04L 1/20 375/240.27 |
| 8,265,145 | B1 * | 9/2012 | Pejhan | H04N 19/105 370/342 |
| 8,374,240 | B1 * | 2/2013 | Namboodiri | H04N 19/423 375/240.12 |
| 2002/0031123 | A1 * | 3/2002 | Watanabe | H04L 1/0041 370/389 |
| 2002/0048323 | A1 * | 4/2002 | Kang | H04N 19/30 375/240.27 |
| 2002/0176025 | A1 * | 11/2002 | Kim | H03M 7/30 348/699 |
| 2004/0001547 | A1 * | 1/2004 | Mukherjee | H04N 19/51 375/240.16 |
| 2004/0080669 | A1 * | 4/2004 | Nagai | H04N 19/517 348/384.1 |
| 2005/0031030 | A1 | 2/2005 | Kadono et al. | |
| 2005/0163211 | A1 * | 7/2005 | Shanableh | H04N 19/29 375/240.1 |
| 2006/0013318 | A1 * | 1/2006 | Webb | H04N 19/70 375/240.25 |
| 2006/0098738 | A1 * | 5/2006 | Cosman | H04N 19/159 375/240.16 |
| 2006/0188025 | A1 | 8/2006 | Hannuksela | |
| 2007/0073779 | A1 | 3/2007 | Walker et al. | |
| 2007/0088971 | A1 | 4/2007 | Walker et al. | |
| 2007/0206673 | A1 * | 9/2007 | Cipolli | H04L 1/1607 375/240.1 |
| 2008/0165864 | A1 * | 7/2008 | Eleftheriadis | H04N 21/23432 375/240.29 |
| 2008/0170564 | A1 | 7/2008 | Shi et al. | |
| 2009/0213938 | A1 | 8/2009 | Lee et al. | |
| 2009/0213940 | A1 | 8/2009 | Steinbach et al. | |
| 2010/0150230 | A1 | 6/2010 | Zhou et al. | |
| 2011/0069756 | A1 | 3/2011 | Matthews | |
| 2012/0287999 | A1 | 11/2012 | Li et al. | |
| 2012/0300846 | A1 * | 11/2012 | Sugio | H04N 19/521 375/240.16 |
| 2013/0089152 | A1 | 4/2013 | Wang et al. | |
| 2013/0128948 | A1 | 5/2013 | Rabii et al. | |
| 2013/0142257 | A1 | 6/2013 | Wang et al. | |
| 2013/0272430 | A1 * | 10/2013 | Sullivan | H04N 19/70 375/240.26 |

OTHER PUBLICATIONS

Bross et al., "High Efficiency Video Coding (HEVC) Text Specification Draft 6," Joint Collaborative Team on Video Coding (JCT-VC) of ITU-T SG16 WP3 and ISO/IEC JTC1/SC29/WG11, 7th Meeting: Geneva, CH, Nov. 21-30, 2011.

Kim et al., "Channel Adaptive Error Resilience Scheme for Video Transmission Over Mobile WiMAX," IEICE Transactions on Communications, Communications Society, Tokyo, JP, vol. E91-B, No. 10, Oct. 1, 2008, pp. 3052-3059.

Fukunaga et al., "Error Resilient Video Coding by Dynamic Replacing of Reference Pictures," IEEE Globecom , vol. 3, Nov. 18,1996, pp. 1503-1508.

Aissa et al., "Coding with Dynamic Rate Control for Low-Delay Image Transmission over CDMA Fading Channels," Vehicular Technology Conference, IEEE, vol. 2, May 18, 1998, pp. 1488-1492.

Duong et al., "Efficient Frame Error Concealment Using Bilateral Motion Estimation for Low-Bit Rate Video Transmission," IEICE Transactions on Communications, Communications Society, Tokyo, JP, vol. E92B, No. 2, Feb. 1, 2009, pp. 461-472.

Cote et al., "Using GFID in Error Prone Environments," ITU Study Group 16—Video Coding Experts Group, Feb. 16, 1999, p. 1.

PCT International Search Report and Written Opinion for PCT/US2013/043395, mailed on Dec. 13, 20 pages.

Stephan Wenger et al., "Error Resilience Support in H.263+," Tampere, Finland, Video Coding Experts Group of ITU-T SG. 16, Document No. Q15-D-17, Apr. 15, 1998, XP030002765, 21 pages.

Rickard Sjoberg et al., "Absolute signaling of reference pictures," Joint Coiiaborative Team on Video Coding (JCT-VC) of ITU-T SG16 WP3 and ISO/IEC JTC1/SC29/WG11, 6th Meeting: Torino, Document No. JCTVC-F493, m20923, Jul. 22, 2011, XP030049486, 15 pages.

Pat Mulroy et al., "Windowed Reference Picture Selection for H.264 Transmission Error Recovery," Broadband Applications Research Centre, BT, Adastral Park, Ipswich, UK, Nov. 7, 2007, XP030080494, 4 pages.

Dr Stephan Wenger, "Video Redundancy Coding Simulation Results," 2 VCEG Meeting, Sunriver, Oregon, Video Coding Experts Group of ITU-T Sg.16, Document No. Q15-B-18, Sep. 3, 1997, XP030002657, 8 pages.

Chen et al., "Distributed Video Coding with Adaptive Selection of Hash Functions"; Received Jun. 16, 2010; Revision accepted Nov. 19, 2010; Crosschecked Mar. 31, 2011; Journal of Zhejiang University-Science C (Computers & Electronics) ISSN 1869-1951 (Print); ISSN 1869-196X (Online).

Zhang et al., "Cross-Layer Frame Discarding for Cellular Video Coding", IEEE International Conference on Acoustics, Speech and Signal Processing, Apr. 15-20, 2007, ICASSP 2007, vol. 2.

Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, CH, Apr. 27-May 7, 2012.

Bross et al., "High Efficiency Video Coding (HEVC) Text Specification Draft 8," Joint Collaborative Team on Video Coding (JCT-VC) of ITU-T SG16 WP3 and ISO/IEC JTC1/SC29/WG11, 10th Meeting: Stockholm, SE, Jul. 11-20, 2012.

Bross et al., "High Efficiency Video Coding (HEVC) Text Specification Draft 10 (for FDIS & Consent)," Joint Collaborative Team on Video Coding (JCT-VC) of ITU-T SG16 WP3 and ISO/IEC JTC1/SC29/WG11, 12th Meeting: Geneva, CH, Jan. 14-23, 2013.

* cited by examiner

100

200

300

400

ERROR RESILIENT MANAGEMENT OF PICTURE ORDER COUNT IN PREDICTIVE CODING SYSTEMS

BACKGROUND

The present invention relates to video coding systems and, in particular, to management of synchronization between encoder and decoders in the video coding systems.

In video coding systems, a video encoder may code a source video sequence into a coded representation that has a smaller bit rate than does the source video and, thereby may achieve data compression. The encoder may code processed video data according to any of a variety of different coding techniques to achieve compression. One common technique for data compression uses predictive coding techniques (e.g., temporal/motion predictive coding). For example, some frames in a video stream may be coded independently (I-frames) and some other frames (e.g., P-frames or B-frames) may be coded differentially using other frames as prediction references. P-frames may be coded with reference to a single previously coded frame (called, a "reference frame") and B-frames may be coded with reference to a pair of previously-coded reference frames. The resulting compressed sequence (bit stream) may be transmitted to a decoder via a channel. To recover the video data, the bit stream may be decompressed at the decoder by inverting the coding processes performed by the coder, yielding a recovered video sequence.

Such coding schemes require that the encoder and decoder synchronize their operations to properly associate coded frames with the reference frames on which they rely. In most existing video coding standards, each coded frame is assigned an index to indicate its display order. In H.264 and the emerging HEVC standard, ITU-T document JCTVC-J1003_d7 (herein, "HEVC"), such an index is called the "picture order count" (POC) and it is signaled in the slice header of every slice. POC is also used for other purposes. For example, in HEVC, POC is proposed for use as a frame identifier in the reference picture buffer.

In order to reduce the overhead of signaling POC, coding protocols usually define that the least significant bits (LSB) of the POC are to be signaled in the bit stream. The decoder then uses the following logic to determine the most significant bits (MSB) of the POC.

TABLE 1

```
if( ( pic_order_cnt_lsb < prevPicOrderCntLsb ) &&
      ( ( prevPicOrderCntLsb − pic_order_cnt_lsb ) >=
      ( MaxPicOrderCntLsb/2 ) ) )
   PicOrderCntMsb = prevPicOrderCntMsb + MaxPicOrderCntLsb
else if( ( pic_order_cnt_lsb > prevPicOrderCntLsb ) &&
      ( (pic_order_cnt_lsb − prevPicOrderCntLsb ) >
      ( MaxPicOrderCntLsb/2 ) ) )
   PicOrderCntMsb = prevPicOrderCntMsb − MaxPicOrderCntLsb
else
   PicOrderCntMsb = prevPicOrderCntMsb
```

Under this scheme, a decoder may detect whether the difference of the POC LSBs of a current coded frame and the previously-coded frame is more than half of the maximal POC LSB value, in order to determine the MSB.

The above method works well when the decoder correctly receives all the frames from the encoder. In video communication over error-prone networks, however, video frames can be lost. If more than (MaxPicOrderCntLsb/2) number of consecutive frames are lost during transmission, the above logic will no longer work correctly and can result in a mismatch in POC values between the encoder and the decoder. Modern coding environments include error-prone networks, such as wireless networks, where intermittent network connectivity losses can arise, which lead to loss of significant portions of a coded video sequence. Accordingly, the inventors have identified a need for a coding protocol that provides for reliable synchronization of picture order counts between an encoder and a decoder even when communication errors cause losses of coded video data.

DETAILED DESCRIPTION

Embodiments of the present invention provide coding techniques for input video in which an input frame is coded according to predictive coding and it is estimated whether communication errors have arisen for previously-coded video. If a network error has occurred, the input frame may be assigned a picture identifier that is coded in a long-form coding format. If no network error has occurred, the input frame may be assigned a picture identifier that is coded in a short-form coding format. Long-form coding may mitigate against loss of synchronization between an encoder and a decoder by picture identifiers.

Figure 1:
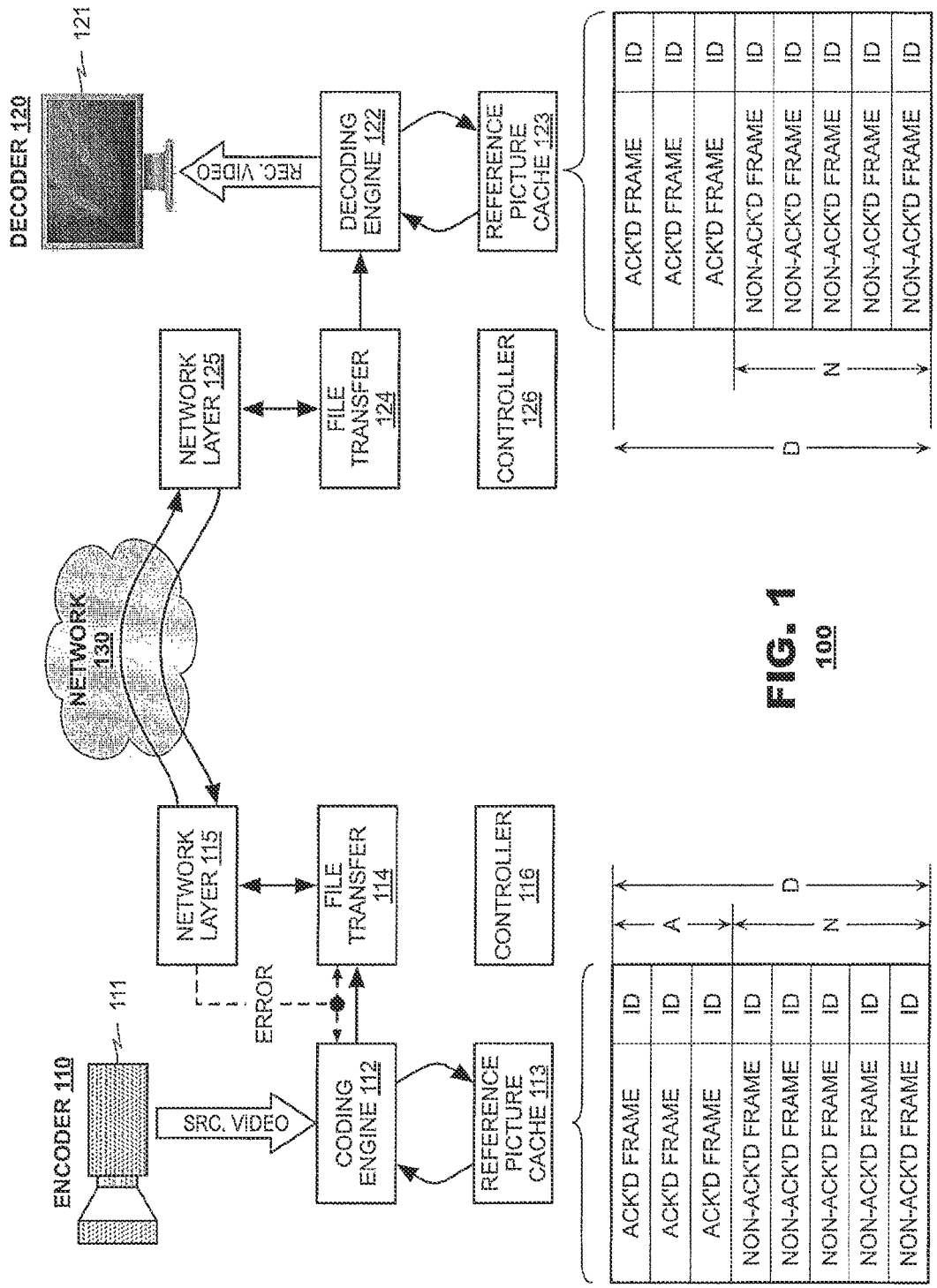
FIG. 1 is a simplified block diagram of an encoder/decoder system according to an embodiment of the present invention.

FIG. 1 is a simplified block diagram of video coding system 100 according to an embodiment of the present invention. The system 100 may include an encoder 110 and a decoder 120 interconnected via a network 130. The encoder 110 may generate video data representing locally-captured image information and may code it for delivery over the network 130. The network 130 may deliver the coded video to a decoder 120. The decoder 120 may reconstruct a replica of the source video from the coded video and may render it for local viewing.

In FIG. 1, the encoder 110 and decoder 120 may be provided within a variety of computing platforms, including servers, personal computers, laptop computers, tablet computers, smart phones, media players and/or dedicated video conferencing equipment. The network 130 represents any number of networks that convey coded video data among the encoder 110 and decoder 120, including, for example, wireline and/or wireless communication networks. A communication network may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present invention unless explained hereinbelow.

The encoder 110 may include a video source 111, a coding engine 112, a reference picture cache 113, a file transfer unit 114, a network layer processor 115 and a controller 116. The video source 111 may generate the video sequence for coding. Typical video sources include cameras that generate video from locally-captured image information and storage devices or screen buffers (not shown) in which video may be stored, e.g., for media serving applications. The coding engine 112 may code frames of video data according to motion-compensated or intra-predictive coding. The reference picture cache 113 may store decoded video data obtained from coded frames marked as reference frames by the coding engine 112 for use in predictive coding of other frames. The coding engine 112 may include a local decoder to generate the decoded video data (not shown in FIG. 1). The file transfer unit 114 may store coded video data as it is output by the coding engine 112 and awaiting transmission via the network 130. The network layer processor 115 may manage communication of video data to a decoder 120 over a network channel.

The decoder 120 may include a rendering unit 121, a decoding engine 122, a reference picture cache 123, a file transfer unit 124, a network layer processor 125 and a controller 126. These components may invert operations of the encoder 110. The network layer processor 125 may manage reception of data received from the encoder 110 via the network 130. The file transfer unit 124 may buffer the received data, may parse the data into component data streams and may forward coded video data to the decoding engine 122. The decoding engine 122 may invert coding processes applied by the coding engine 112 and generate decoded video therefrom. The decoding engine 122 may output the recovered video data to the rendering unit 121 for consumption. The rendering unit may be a display, a storage device or scaler (not shown) to which recovered video data may be output. The decoding engine 122 may output the recovered video data of reference frames to the reference picture cache 123, which may store the decoded reference frames for use in later decoding operations.

FIG. 1 also schematically illustrates entries of the reference picture caches 113, 123. The caches 113, 123 each may have sufficient capacity to store a predetermined number of reference frames. The encoder 110 and decoder 120 operate according to common cache management policies that are designed to ensure their caches 113, 123 operate in synchronization in the absence of channel errors. When transmission errors occur that cause coded reference frames to be lost, the decoder's reference picture cache 123 typically will lose synchronization with the encoder's reference picture cache 113. The reference picture caches 113, 123 may store POC identifiers in association with each reference frame.

The system 100 may support two different types of reference frames. "Acknowledged frames" are frames that are acknowledged by a decoder 120 via signaling and, once acknowledged, are confirmed by the encoder 110 to have been stored properly in the reference picture cache 123 of the decoder 120. "Non-acknowledged frames" are frames that are not acknowledged by the decoder 120 and, therefore, are not confirmed by the encoder 110 to have been stored properly in the reference picture cache 123 of the decoder 120.

During operation, frames of input video data may be coded by the coding engine 112 and output to the file transfer unit 114. The file transfer unit 114 may include a buffer (not shown) to store coded video data until it is to be transmitted and may include sub-systems to merge the coded video data with other data streams, such as audio data and/or metadata (also not shown), into a channel bit stream for transmission. The network layer processor 115 may retrieve channel bit stream data, format it for delivery over the network 130 and transmit the formatted data to the network 130.

The network layer processor 115 also may receive indicators from the network 130 and/or the decoder 120 (via the network 130) regarding transmission errors that may occur to the channel bit stream. The network layer processor 115 may provide error indications to the coding engine 112 and/or the file transfer unit 114. In response, the coding engine 112 may engage error recovery processes as described herein. The file transfer unit 114 also may respond to error notifications by purging its queues of coded data that await transmission, as described herein.

The network layer processor 125 of the decoder 120 may manage communication with the network 130. In the absence of transmission errors, the network layer processor 125 may receive the channel bit stream and forward the bit stream to a local file transfer unit 124. When transmission errors occur, the network layer processor 125 may report error indicators to the encoder 110 via the network 130. The file transfer unit 124 may store the received data in a queue (not shown), parse the data into component data streams such as coded video streams, coded audio streams, etc. The file transfer unit 124 may forward the coded video data to the decoding engine 122. When the decoding engine 122 decodes reference frames that are marked as requiring acknowledgments to the encoder 110, the decoder 120 may create acknowledgment messages which are transmitted to the encoder 110 via the file transfer unit 124 and network layer processor 125 (path not shown in FIG. 1).

Figure 2:
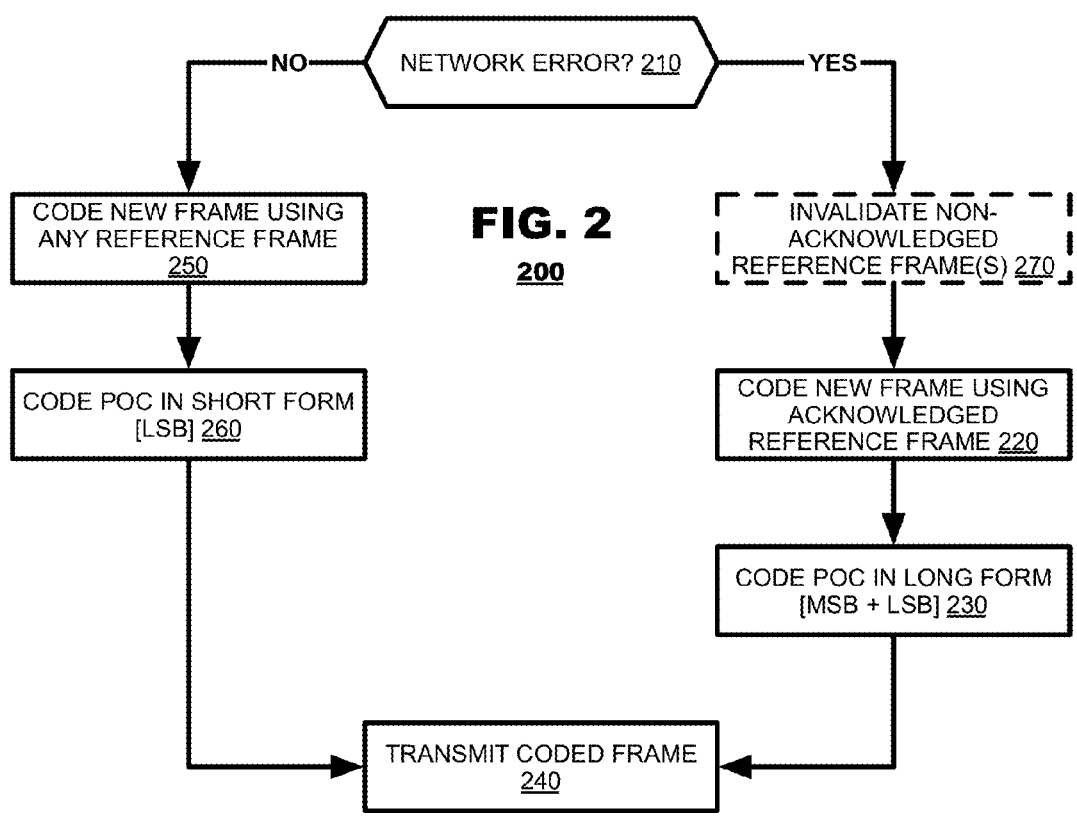
FIG. 2 illustrates a method according to an embodiment of the present invention.

FIG. 2 illustrates a method according to an embodiment of the present invention. The method 200 may be performed when a new frame is available for coding. The method 200 may determine if a network error has occurred (box 210). If so, the method 200 may cause the new frame to be coded predictively using acknowledged reference frame(s) as a basis for prediction (box 220). The method 200 may code the POC using a long-form representation (box 230) that uniquely identifies the input frame notwithstanding the network error. Thereafter, the method 200 may transmit the coded frame via the channel (box 240).

When a network error is not present, the method 200 may cause the new frame to be coded predictively using any available reference frame(s) as bases for prediction (box 250). The method 200 may code the POC using a short-form representation (box 260) that conserves bits in the channel data. Thereafter, the method 200 may transmit the coded frame via the channel (box 240).

In implementation, for boxes 220 and 250, the identification of which reference frame(s) to serve as prediction reference(s) for an input frame may be influenced both by the content of the input frame and the coding protocol at work. Typically, an encoder performs a motion prediction search that compares content of the input frame to content of reconstructed reference frames that are stored locally in the encoder's reference picture cache. When matching content is found in the reference picture cache, the encoder may include predictor data that includes an identification of the reference picture that was selected and a motion vector that identifies a location within the reference picture where prediction data is to be found. The encoder may code residual data as necessary, which represents a difference between content of the input frame and content of the reference frame. The motion estimation search, prediction and coding may occur iteratively over several pixel blocks within the input frame and, therefore, different pixel blocks may have different reference frame(s) and motion vectors from each other and, therefore, a single coded frame may rely upon several other reference frames as source of prediction. A coding protocol, however, may limit operation of these processes, for example, by limiting the number of reference frames that a single input frame may rely upon as a prediction reference.

The principles of the present invention may work cooperatively with these motion search and coding operations. In box 250, the motion estimation search and prediction operations may refer to any reconstructed reference frame that is available to the encoder subject to, of course, any limitation imposed by a coding protocol or other constraint. In box 220, however, the motion estimation search and prediction operations may be constrained to refer only to reconstructed reference frames that are identified to the encoder as having been decoded properly by the decoder. In this manner, the newly coded frame (assuming it is received and decoded properly) should stop propagation of any coding errors that may arise due to the network error the encoder may code the new frame with reference to reference frame(s) that are "known" to be received and decoded properly at the decoder. Moreover, the encoder may mark the new frame with a POC in long form, which should overcome any loss of synchronization that otherwise might have occurred due to the network error.

In an embodiment, when a network error occurs, the method 200 also may invalidate any non-acknowledged reference frame(s) at the encoder's reference picture cache (box 270). Invalidating the non-acknowledged reference frames may ensure that, on successive iterations of the method 200 when network errors no longer exist, input frames are not inadvertently coded using reference frames that may have been lost due to the network error.

Figure 3:
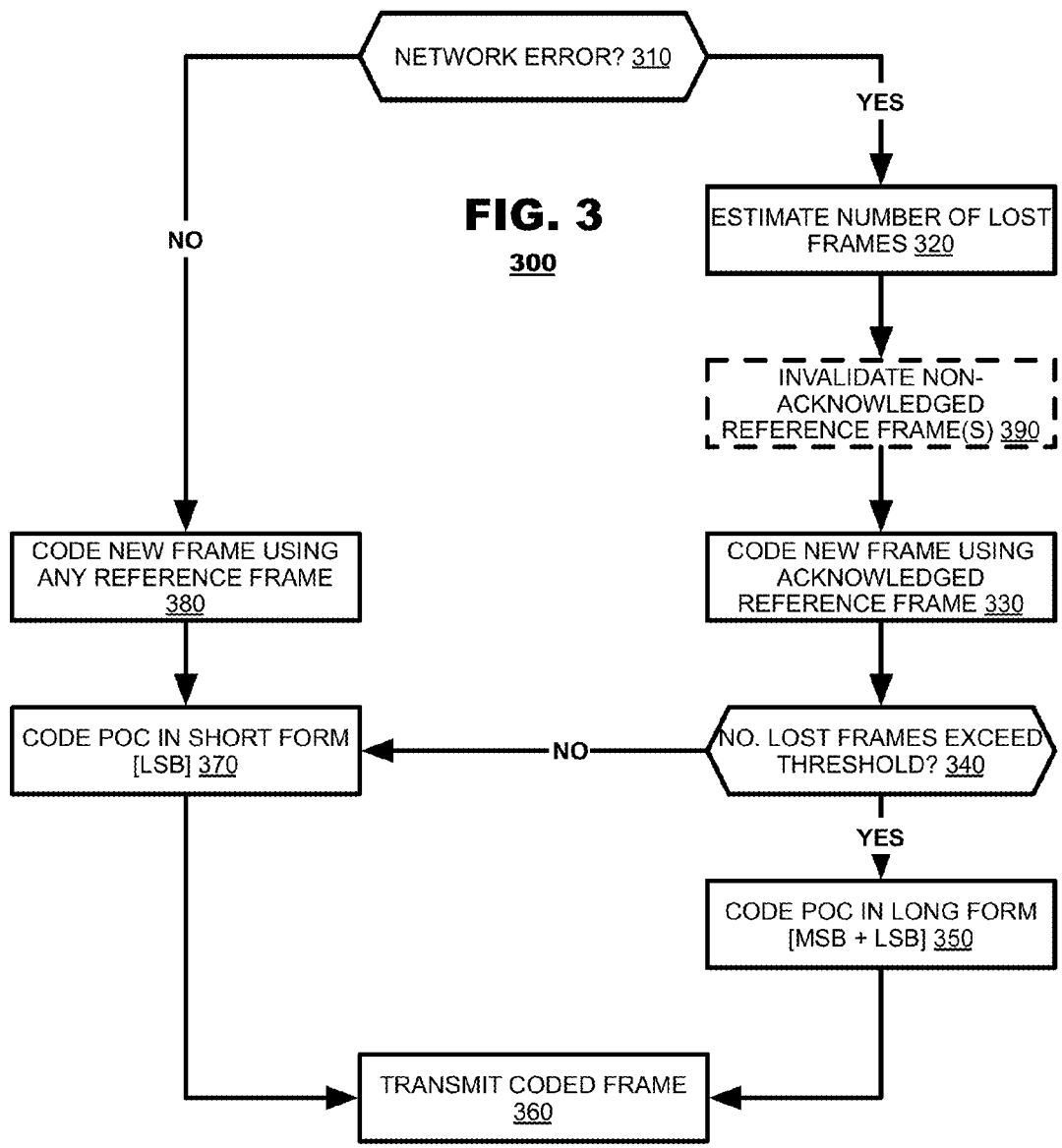
FIG. 3 illustrates a method according to another embodiment of the present invention.

FIG. 3 illustrates a method 300 according to another embodiment of the present invention. The method 300 may be performed when a new frame is available for coding. The method 300 may determine if a network error has occurred (box 310). If so, the method 300 may estimate a number of frames that may have been lost due to the network error (box 320). The method 300 may cause the new frame to be coded predictively using acknowledged reference frame(s) as a basis for prediction (box 330). Alternatively, the method 300 may code the new frame as an intra refresh frame. The method 300 may determine whether the number of lost frames exceeds a predetermined threshold (box 340). If so, the method 300 may code the POC using a long-form representation (box 350) that uniquely identifies the input frame notwithstanding the network error. Thereafter, the method 300 may transmit the coded frame via the channel (box 360).

If at box 340 the number of lost frames does not exceed the threshold, the method may code the POC using a short-form representation that conserves bits in the channel data (box 370). Thereafter, the method 300 may advance to box 360 and transmit the coded frame via the channel.

If at box 310 no network error occurred, the method 300 may cause the new frame to be coded predictively using any available reference frame(s) as bases for prediction (box 380). The method 300 may advance to box 370 and code the POC using the short-form representation. Thereafter, the method 300 may advance to box 360 and transmit the coded frame via the channel.

As in the prior embodiment, the method 300 of FIG. 3 may work cooperatively with common motion search and coding operations. In box 380, the motion estimation search and prediction operations may refer to any reconstructed reference frame that is available to the encoder subject to, of course, any limitation imposed by a coding protocol or other constraint. In box 330, however, the motion estimation search and prediction operations may be constrained to refer only to reconstructed reference frames that are identified to the encoder as having been decoded properly by the decoder. Again, the newly coded frame (assuming it is received and decoded properly) should stop propagation of any coding errors that may arise due to the network error. Moreover, the encoder may mark the new frame with a POC in long form, which should overcome any loss of synchronization that otherwise might have occurred due to the network error.

The threshold for lost frames in box 340 may be set based on the coding protocols at work in the video coding system. For example, in an HEVC-based coder, when a simple coding structure is used (ex.: IPPPPP), the threshold may be set to MaxPicOrderCntLsb/2. If the encoder determines that the network error affected a number of frames fewer than MaxPicOrderCntLsb/2, the encoder may code the POC in the short form (box 370) but, if the method 300 determines that the network error affected a number of frames greater than or equal to MaxPicOrderCntLsb/2, the method 300 may code the POC in the long form (box 350). Different threshold values may be set for different coding protocols.

Optionally, the motion estimation searches and prediction operations of box 330 may be expanded to include non-acknowledged references frame(s) that fall outside a range of lost frames estimated in box 320. Such an embodiment may find application in encoding environments where a network error's correspondence to the coded video stream can be identified well enough to permit the encoder to identify reference pictures that likely are lost due to transmission errors. In such an embodiment, non-acknowledged reference frames need not be disqualified from serving as prediction references if the encoder estimates that they were not subject to the network error.

In an embodiment, when a network error occurs, the method 300 also may invalidate any non-acknowledged reference frame(s) at the encoder's reference picture cache (box 390). Invalidating the non-acknowledged reference frames may ensure that, on successive iterations of the method 300 when network errors no longer exist, input frames are not inadvertently coded using reference frames that may have been lost due to the network error. In embodiments where an encoder can identify reference pictures that likely are lost due to transmission errors, the operations of box 390 need not invalidate non-acknowledged reference frames that were not subject to the network error.

Table 2 illustrates a coding syntax for a long-form POC coding representation according to an embodiment of the present invention. The long-form POC representation may be integrated into the syntax of a slice. In the example of Table 2, the long-form POC representation is shown as applied to the syntax of a slice as defined in HEVC:

TABLE 2

| slice_header( ) { | Descriptor |
|---|---|
|     first_slice_in_pic_flag | u(1) |
|     if( RapPicFlag ) | |
|         no_output_of_prior_pics_flag | u(1) |
|     pic_parameter_set_id | ue(v) |
|     if( !first_slice_in_pic_flag ) | |
|         slice_address | u(v) |

TABLE 2-continued

| slice_header( ) { | Descriptor |
|---|---|
|    if( dependent_slice_enabled_flag && !first_slice_in_pic_flag ) | |
|       dependent_slice_flag | u(1) |
|    if( !dependent_slice_flag ) { | |
|       slice_type | ue(v) |
|       if( output_flag_present_flag ) | |
|          pic_output_flag | u(1) |
|       if( separate_colour_plane_flag = = 1 ) | |
|          colour_plane_id | u(2) |
|      if( !IdrPicFlag ) { | |
|          pic_order_cnt_lsb | u(v) |
|          if( explicit_pic_order_cnt_msb_cycle_enabled_flag ) { | |
|             explicit_pic_order_cnt_msb_cycle_present_flag | u(1) |
|             if( explicit_pic_order_cnt_msb_cycle_present_flag ) | |
|                explicit_pic_order_cnt_msb_cycle | ue(v) |
|      } | |

In this example, the field "pic_order_cnt_msb_present_flag" may be a single bit flag to indicate that a second field, the "pic_order_cnt_msb," is present. The pic_order_cnt_msb field may be multi-bit field that provides the most significant bits of the POC field. The pic_order_cnt_msb_present_flag and pic_order_cnt_msb fields may be coded into a header for first slice of the input picture being coded.

The foregoing embodiments provide for error resilient coding of POCs with minimal impact on channel resources. As indicated, the long-form POC coding may be used when network errors are identified such that the long form becomes appropriate. Further, use of a flag to indicate the presence of a long-form POC further conserves channel resources by including long-form markers only when necessary. In this manner, the embodiments of the present invention provide a channel-efficient resolution to the synchronization problem that would not be achieved with other candidate solutions such as those that would code the entire POC on every frame or others that might increase the number of bits for LSB coding of the POC. Although these brute force solutions might resolve the synchronization problem, both would introduce large overhead into the coding syntax.

Another approach to re-establish POC synchronization might involve having an encoder code a new frame as an Instantaneous Decoder Refresh (IDR) frame. Many modern coding protocols define that IDR frames, when decoded, cause decoders to clear state variables that may have been established prior to decoding the IDR frame. In the case of the POC, such IDR frames cause the POC to be reset (POC=0). IDR frames are coded non-predictively; they incur high bit rates relative to other coding modes and, therefore, are expensive to code. Thus, using IDR frames to re-establish POC synchronization is an expensive solution. The techniques proposed herein permit POC synchronization while, at the same time, permitting new input frames to be coded predictively as P- or B-frames. Accordingly, the present embodiments can contribute to bandwidth conservation in a video coding session.

In the example of Table 2, the pic_order_cnt_msb_signaling_enabled_flag may be set as an optional field within the first slice of data. In this manner, the syntax may eliminate all overhead when no frame loss is expected. This flag can be signaled in other elements of the bit stream, for example, a sequence parameter set (SPS) as illustrated in Table 3 below.

TABLE 3

| seq_parameter_set_rbsp( ) { | Descriptor |
|---|---|
|    video_parameter_set_id | u(4) |
|    sps_max_sub_layers_minus1 | u(3) |
|    sps_reserved_zero_bit | u(1) |
|    profile_and_level( 1, sps_max_sub_layers_minus1 ) | |
|    seq_parameter_set_id | ue(v) |
|    chroma_format_idc | ue(v) |
|    if( chroma_format_idc = = 3 ) | |
|       separate_colour_plane_flag | u(1) |
|    pic_width_in_luma_samples | ue(v) |
|    pic_height_in_luma_samples | ue(v) |
|    pic_cropping_flag | u(1) |
|    if( pic_cropping_flag ) { | |
|       pic_crop_left_offset | ue(v) |
|       pic_crop_right_offset | ue(v) |
|       pic_crop_top_offset | ue(v) |
|       pic_crop_bottom_offset | ue(v) |
|    } | |
|    bit_depth_luma_minus8 | ue(v) |
|    bit_depth_chroma_minus8 | ue(v) |
|    pcm_enabled_flag | u(1) |
|    if( pcm_enabled_flag ) { | |
|       pcm_sample_bit_depth_luma_minus1 | u(4) |
|       pcm_sample_bit_depth_chroma_minus1 | u(4) |
|    } | |
|    log2_max_pic_order_cnt_lsb_minus4 | ue(v) |
|    explicit_pic_order_cnt_msb_cycle_enabled_flag | u(1) |

In an embodiment, a long form POC need not represent the POC in its entirety. For example, an encoder may set dynamically the number of bits to be included in the long form POC and identify the number of bits to a decoder via signaling in a channel. For example, if POC in its entirety is 32 bits and LSB is 4 bits, an encoder may include a long form POC having 8 bits (the 4 LSB bits of the short form POC and another 4 bits taken from the MSB portion of the POC). The encoder may set the number of bits dynamically in response to channel estimates, for example, packet loss rates, bit error rates and/or decoder messages that indicate loss of data. Moreover, the encoder may revise the number of bits to be assigned to the long form POC in response to changing conditions in the channel.

Table 4 illustrates an exemplary syntax to communicate the size of a long form POC to a decoder.

TABLE 4

| seq_parameter_set_rbsp( ) { | Descriptor |
|---|---|
|    video_parameter_set_id | u(4) |
|    sps_max_sub_layers_minus1 | u(3) |

TABLE 4-continued

| seq_parameter_set_rbsp( ) { | Descriptor |
|---|---|
| sps_reserved_zero_bit | u(1) |
| profile_tier_level( 1, sps_max_sub_layers_minus1 ) | |
| seq_parameter_set_id | ue(v) |
| chroma_format_idc | ue(v) |
| if( chroma_format_idc = = 3 ) | |
|     separate_colour_plane_flag | u(1) |
| pic_width_in_luma_samples | ue(v) |
| pic_height_in_luma_samples | ue(v) |
| pic_cropping_flag | u(1) |
| if( pic_cropping_flag ) { | |
|     pic_crop_left_offset | ue(v) |
|     pic_crop_right_offset | ue(v) |
|     pic_crop_top_offset | ue(v) |
|     pic_crop_bottom_offset | ue(v) |
| } | |
| bit_depth_luma_minus8 | ue(v) |
| bit_depth_chroma_minus8 | ue(v) |
| pcm_enabled_flag | u(1) |
| if( pcm_enabled_flag ) { | |
|     pcm_sample_bit_depth_luma_minus1 | u(4) |
|     pcm_sample_bit_depth_chroma_minus1 | u(4) |
| } | |
| log2_max_pic_order_cnt_lsb_minus4 | ue(v) |
| num_explicit_pic_order_cnt_msb_cycle_bits | ue(v) |

In this example, the long form POC may be communicated to a decoder in two fields, an MSB field and an LSB field. The field num_explicit_pic_order_cnt_msb_cycle_bits may indicate the size for the MSB field. Other elements are listed as described in HEVC.

Table 5 illustrates an exemplary syntax to communicate POCs in another embodiment of the present invention.

TABLE 5

| slice_header( ) { | Descriptor |
|---|---|
| first_slice_in_pic_flag | u(1) |
| if( RapPicFlag ) | |
|     no_output_of_prior_pics_flag | u(1) |
| pic_parameter_set_id | ue(v) |
| if( !first_slice_in_pic_flag ) | |
|     slice_address | u(v) |
| if( dependent_slice_enabled_flag && !first_slice_in_pic_flag ) | |
|     dependent_slice_flag | u(1) |
| if( !dependent_slice_flag ) { | |
|     slice_type | ue(v) |
|     if( output_flag_present_flag ) | |
|         pic_output_flag | u(1) |
|     if( separate_colour_plane_flag = = 1 ) | |
|         colour_plane_id | u(2) |
|     if( !IdrPicFlag) { | |
|         pic_order_cnt_lsb | u(v) |
|         if( num_explicit_pic_order_cnt_msb_cycle_bits> 0 ) { | |
|             explicit_pic_order_cnt_msb_cycle_present_flag | u(1) |
|             if( explicit_pic_order_cnt_msb_cycle_present_flag ) | |
|                 explicit_pic_order_cnt_msb_cycle | u(v) |
|         } | |

In this example, the pic_order_cnt_lsb may identify the LSB of the POC, the explicit_pic_order_cnt_msb_cycle_present_flag field may indicate whether an MSB field is present and the explicit_pic_order_cnt_msb_cycle field may identify the MSB of the POC. Other elements are listed as described in HEVC.

Figure 4:
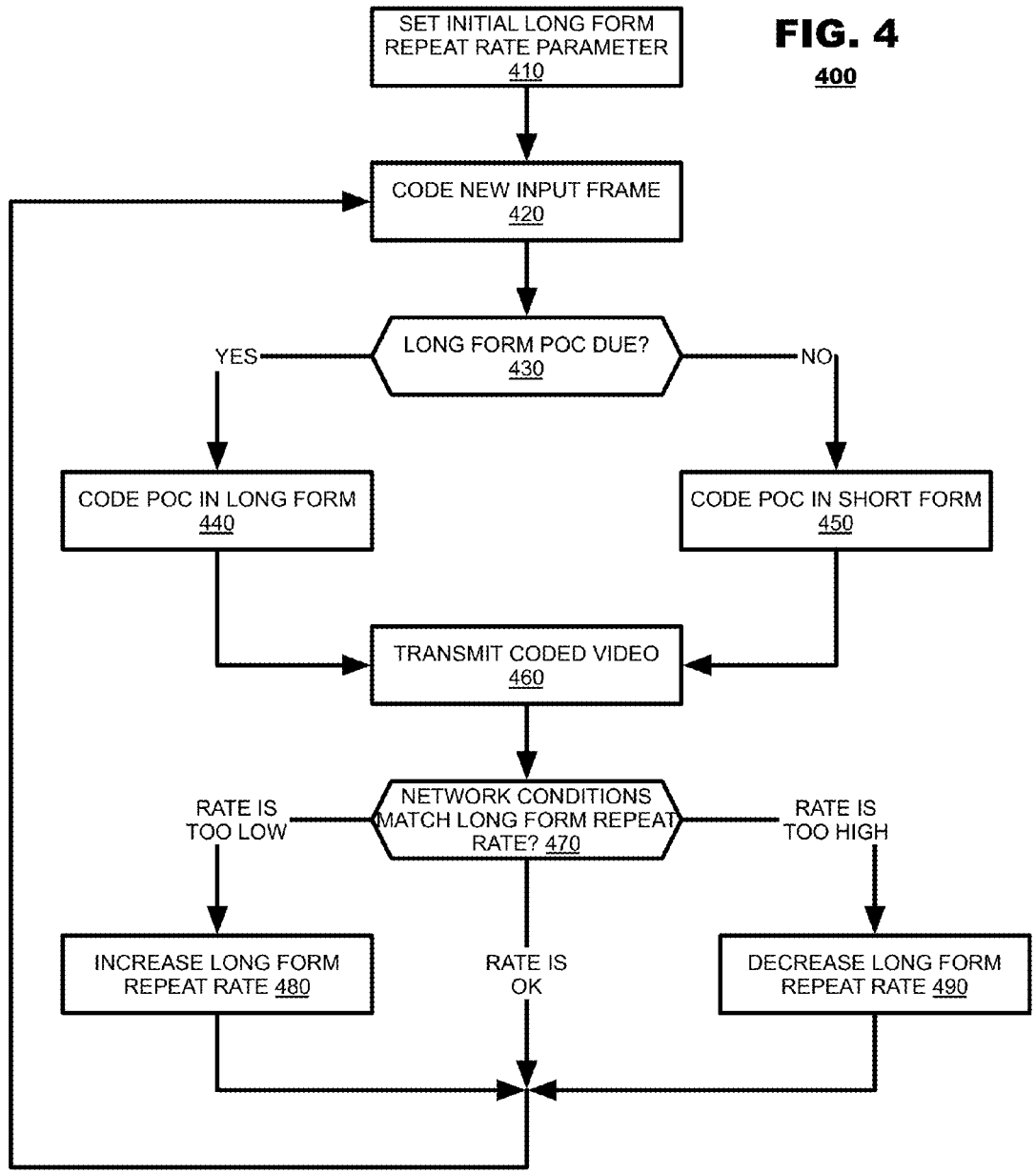
FIG. 4 illustrates a method according to a further embodiment of the present invention.

FIG. 4 illustrates a method 400 according to another embodiment of the present invention. The method 400 may begin upon initiation of a video coding session in which a repeat parameter is set for long-form coding (box 410). Thereafter, the method 400 may begin a recursive process to code input video data. Specifically, the method 400 may code a new input frame according to motion-compensated prediction techniques (box 420) such as those specified in H.264 and/or HEVC. Once the input frame is coded, the method 400 may determine whether the frame's POC is to be coded in long form or short form (box 430). The method may make its determination with reference to a current repeat rate by determining how many frames have elapsed since long-form coding of the POC was used. If the method 400 determines that long-form coding is due, then the method 400 may code the POC using long form (box 440); otherwise, the method 400 may use short-form coding for the POC (box 450). Thereafter, the method 400 may transmit the coded video via a channel (box 460).

The method 400 also may evaluate network conditions to determine whether the long-form repeat rate should be revised (box 470). For example, the method 400 may evaluate indicators of channel errors, such as bit error rates, packet loss notifications and/or round trip delay, from the channel to estimate probabilities of frame loss. The method 400 may determine whether a current refresh rate is too low, too high or at appropriate settings. When the method 400 determines that the repeat rate is too low, it may increase the repeat rate (box 480). Alternatively, when the method 400 determines that the repeat rate is too high, it may decrease the repeat rate (box 490). If the repeat rate is appropriate, then the method 400 need not revise it. The method 400 may conclude operation for a current frame and return to box 420 for another input frame.

Although FIG. 4 illustrates the method 400 as evaluating whether the repeat rate should be revised on a frame-by-frame basis, other embodiments permit these evaluations to occur at a different rate. In other embodiments, the operation of boxes 470-490 may occur on an every Nth frame basis (where N is a programmable value), may occur at a periodic rate (e.g., once per N msec) or may be revised in response to network error notifications.

During operation, decoders may decode the long form and short form POCs from channel data and assign POCs to decoded frames. The POCs may be stored in the decoder reference picture cache for use in interpreting prediction references from channel data. The decoder may estimate full POC identifiers from the long form and short form POCs that are received and also by monitoring counts of pictures that are received from the channel and decoded.

In another embodiment, long form coding of POCs may provide another basis by which a decoder may estimate data loss. A decoder may perform its own calculation of the most significant bits of frame POCs, for example, using the operations listed in Table 1. When decoder receives a long form POC from an encoder, the decoder may compare the most significant bits of the POC as recited with its estimate of the most significant bits for that frame. When a mismatch occurs, the decoder may determine that coded frames have been lost. Further, the decoder can estimate how many frames have been lost based on a difference between the POCs.

In another embodiment, the decoder and encoder may engage in signaling to identify lost frames. When a decoder detects a mismatch between its estimate of the long form POC and the long form POC as received from the channel, the decoder may identify lost frames to the encoder, for example, by providing a timestamp of the last frame that preceded the communication error. In response, an encoder may disqualify reference frames having a timestamp later than the timestamp as reported by the decoder from being used in further prediction operations.

The principles of the present invention find application in other domains as well, for example, prediction references. In another embodiment, an encoder and a decoder may exchange in a signaling protocol that decouples POCs as used for coding from POCs as used to signal prediction references. For example, the encoder may assign POCs to coded frames using a single form of representation, which may be large enough to sustain a predetermined span of consecutive data losses (ex.: minutes or hours). Thus, the POCs may be larger than LSB POCs that are used in conventional coding protocols. For coding of reference frame identifiers, however, an encoder may use a shorter form POC identifier. For example, long term reference picture indexes may be signaled using a short term picture identifier.

Such an embodiment may introduce overhead since for every slice, more bits need to be used to code the POC than in conventional encoders. However, this embodiment may conserve, the expense of coding prediction references by using fewer bits to signal the long term reference frames in the reference picture buffer.

Thus, reference frames in the reference picture buffer may signaled explicitly using a POC in the slice header. By signaling the long term reference frames using a short form identifier, the expense of coding full size POCs (Table 6 below) may be avoided. In this manner, a coding protocol can increase the size of POC for coded pictures, but not for signaling long term reference pictures.

TABLE 6

```
for( i = 0; i < num_long_term_sps + num_long_term_pics; i++ ) {
    if( i < num_long_term_sps )
        lt_idx_sps[ i ]
    else {
        poc_lsb_lt[ i ]
        used_by_curr_pic_lt_flag[ i ]
    }
}
```

The embodiment of paragraphs [44]-[46] introduces an overhead by signaling a relatively large POC for each coded picture and, therefore, the techniques proposed in [11]-[43] are expected to provide greater efficiency. Nevertheless, the embodiment of paragraphs [44]-[46] may be used as desired to signal POCs of different sizes to provide resiliency against errors and to maintain a degree of coding efficiency.

The foregoing discussion has described operation of the embodiments of the present invention in the context of coding servers, distribution servers and client devices. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers or computer servers and are stored on computer readable media thereof. Similarly, decoders can be embodied in integrated circuits, such as application specific integrated circuits, field programmable gate arrays and/or digital signal processors, or they can be embodied in computer programs that execute on personal computers, notebook computers or computer servers and are stored on computer readable media thereof. Decoders commonly are packaged in consumer electronics devices, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general purpose processors as desired.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding method, comprising:
   coding an input frame according to predictive coding,
   if a network error has occurred, coding a picture identifier in a long-form coding format,
   if no network error has occurred, coding the picture identifier in a short-form coding format,
   transmitting coded video data and the coded picture identifier to a channel.

2. The method of claim 1, wherein the long-form format includes a first field representing least significant bits of the picture identifier and a second field representing most significant bits of the picture identifier.

3. The method of claim 1, wherein the short-form format includes a first field representing least significant bits of the picture identifier.

4. The method of claim 1, further comprising transmitting a flag indicating whether a long-form format is used.

5. The method of claim 1, further comprising, when the network error has occurred, invalidating non-acknowledged reference frames in a local picture cache.

6. The method of claim 1, wherein, when the network error has occurred, the coding includes performing a motion estimation search on acknowledged reference frames in a local picture cache.

7. The method of claim 1, wherein, when no network error has occurred, the coding includes performing a motion estimation search on acknowledged reference frames and non-acknowledged reference frames in a local picture cache.

8. The method of claim 1, wherein the long-form format is provided in a header field of a first coded slice of the input frame.

9. The method of claim 1, wherein the long-form format is coded using a syntax as follows:
   a pic_order_cnt_lsb field, representing least significant bits of the picture identifier, a pic_order_cnt_msb_present_flag field, representing whether a pic_order_cnt_msb field is present, and a pic_order_cnt_msb field, representing most significant bits of the picture identifier.

10. A method of decoding picture identifiers in a coded video session, comprising:

decoding the picture identifiers as a data stream according to:

```
pic_order_cnt_lsb
If( pic_order_cnt_msb_signaling_enabled_flag) {
    pic_order_cnt_msb_present_flag
    if( pic_order_cnt_msb_present_flag )
        pic_order_cnt_msb
``` wherein pic_order_cnt_lsb, pic_order_cnt_msb_present_flag and pic_order_cnt_msb represent fields in the data stream, in which the pic_order_cnt_lsb field represents least significant bits of the picture identifier, the pic_order_cnt_msb_present_flag field represents whether a pic_order_cnt_msb field is present, and a pic_order_cnt_msb field, representing most significant bits of the picture identifier; and wherein pic_order_cnt_msb_signaling_enabled_flag represents a state variable developed in the session indicating whether the pic_order_cnt_msb_present_flag field has been enabled for the coded picture identifier.

11. A method of decoding picture identifiers in a coded video session, comprising:

decoding the picture identifiers as a data stream according to:

```
pic_order_cnt_lsb
    if( num_explicit_pic_order_cnt_msb_cycle_bits> 0 ) {
        explicit_pic_order_cnt_msb_cycle_present_flag
        if( explicit_pic_order_cnt_msb_cycle_present_flag )
            explicit_pic_order_cnt_msb_cycle
    }
``` wherein pic_order_cnt_lsb, explicit_pic_order_cnt_msb_cycle_present_flag and explicit_pic_order_cnt_msb_cycle represent fields in the data stream, in which the pic_order_cnt_lsb field represents least significant bits of the picture identifier, the explicit_pic_order_cnt_msb_cycle_present_flag field represents whether a pic_order_cnt_msb field is present, and a explicit_pic_order_cnt_msb_cycle field, representing most significant bits of the picture identifier; and wherein num_explicit_pic_order_cnt_msb_cycle_bits represents a state variable transmitted earlier in the session indicating a number of bits to be used for the explicit_pic_order_cnt_msb_cycle field.

12. A video coding method, comprising:

coding an input frame according to predictive coding, if a network error has occurred, estimating a number of frames lost by the network error, if the number of lost frames exceeds a predetermined threshold, coding a picture identifier in a long-form coding format, if the number of lost frames does not exceed the threshold, coding the picture identifier in a short-form coding format, transmitting coded video data and the coded picture identifier to a channel.

13. The method of claim 12, wherein the long-form format includes a first field representing least significant bits of the picture identifier and a second field representing most significant bits of the picture identifier.

14. The method of claim 12, wherein the short-form format includes a first field representing least significant bits of the picture identifier.

15. The method of claim 12, further comprising transmitting a flag indicating whether a long-form format is used.

16. The method of claim 12, further comprising, when the network error has occurred, invalidating non-acknowledged reference frames in a local picture cache.

17. The method of claim 12, wherein, when the network error has occurred, the coding includes performing a motion estimation search on acknowledged reference frames in a local picture cache.

18. The method of claim 12, wherein, when no network error has occurred, the coding includes performing a motion estimation search on acknowledged reference frames and non-acknowledged reference frames in a local picture cache.

19. The method of claim 12, wherein the long-form format is provided in a header field of a first coded slice of the input frame.

20. The method of claim 12, wherein the long-form format is coded using a syntax as follows:

a pic_order_cnt_lsb field, representing least significant bits of the picture identifier, a pic_order_cnt_msb_present_flag field, representing whether a pic_order_cnt_msb field is present, and a pic_order_cnt_msb field, representing most significant bits of the picture identifier.

21. A video coder, comprising:

a coding engine to code video data by motion-compensated predictive coding, a reference picture cache to store reconstructed video of coded reference frames, a transmitter to transmit coded video data to a channel a controller, responsive to network errors, to:

code a picture identifier in a long-form coding format when a network error has occurred, code the picture identifier in a short-form coding format when no network error has occurred.

22. The video coder of claim 21, wherein the long-form format includes a first field representing least significant bits of the picture identifier and a second field representing most significant bits of the picture identifier.

23. The video coder of claim 21, wherein the short-form format includes a first field representing least significant bits of the picture identifier.

24. The video coder of claim 21, wherein the controller includes a flag in the coded video data indicating whether a long-form format is used.

25. The video coder of claim 21, wherein, when the network error has occurred, the controller invalidates non-acknowledged reference frames in the reference picture cache.

26. The video coder of claim 21, wherein, when the network error has occurred, the coding engine performs a motion estimation search on acknowledged reference frames in the reference picture cache.

27. The video coder of claim 21, wherein, when no network error has occurred, the coding engine performs a motion estimation search on acknowledged reference frames and non-acknowledged reference frames in the reference picture cache.

28. The video coder of claim 21, wherein, when a network error has occurred, the controller
   estimates a number of coded video frames lost due to the network error, and
   if the number of lost frames exceeds a predetermined threshold, codes the picture identifier in the long-form coding format, and
   if the number of lost frames does not exceed the threshold, codes the picture identifier in the short-form coding format.

29. The video coder of claim 21, wherein the long-form format is provided in a header field of a first coded slice of a coded input frame.

30. The video coder of claim 21, wherein the long-form format is coded using a syntax as follows:
   a pic_order_cnt_lsb field, representing least significant bits of the picture identifier,
   a pic_order_cnt_msb_present_flag field, representing whether a pic_order_cnt_msb field is present, and
   a pic_order_cnt_msb field, representing most significant bits of the picture identifier.

31. A non-transitory computer readable medium having instructions stored thereon that, when executed by processing device, causes the devices to:
   estimate whether a communication error has occurred involving previously-coded video data,
   code an input frame according to predictive coding,
   if a communication error has occurred, code a picture identifier for the input frame in a long-form coding format, and
   if no communication error has occurred, code the picture identifier for the input frame in a short-form coding format.

32. A decoding method, comprising:
   decoding coded video data, the frames having picture identifiers provided within the coded video data, some picture identifiers provided in a long form representation and other picture identifiers provided in a short form representation,
   when a long form picture identifier is received, locally estimating a long form picture identifier from a previously-received long form picture identifier and short term picture identifier(s) received subsequent to the previously-received long form picture identifier;
   comparing the estimated long form picture identifier to the received long form picture identifier, and
   when the comparison indicates a mismatch, identifying an error in the coded video data.

* * * * *